(12) United States Patent
El Dokor et al.

(10) Patent No.: US 10,222,910 B1
(45) Date of Patent: *Mar. 5, 2019

(54) METHOD AND APPARATUS FOR CREATING AN ADAPTIVE BAYER PATTERN

(71) Applicant: Edge 3 Technologies, Inc., Phoenix, AZ (US)

(72) Inventors: Tarek El Dokor, Phoenix, AZ (US); Joshua King, Mesa, AZ (US); Roger Hauptman, Denver, CO (US)

(73) Assignee: Edge 3 Technologies, Inc., Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/588,656

(22) Filed: May 7, 2017

Related U.S. Application Data

(63) Continuation of application No. 14/925,039, filed on Oct. 28, 2015, now Pat. No. 9,645,680, which is a continuation of application No. 14/045,774, filed on Oct. 3, 2013, now Pat. No. 9,207,759.

(60) Provisional application No. 61/711,177, filed on Oct. 8, 2012.

(51) Int. Cl.
*G06K 9/00* (2006.01)
*G06F 3/042* (2006.01)
*G06F 3/01* (2006.01)
*G06F 3/0488* (2013.01)

(52) U.S. Cl.
CPC ............ *G06F 3/0425* (2013.01); *G06F 3/017* (2013.01); *G06F 3/0488* (2013.01)

(58) Field of Classification Search
None
See application file for complete search history.

(56) References Cited

U.S. PATENT DOCUMENTS

| | | | |
|---|---|---|---|
| 6,009,188 A | 12/1999 | Cohen et al. | |
| 7,088,392 B2 | 8/2006 | Kakarala | |
| 7,916,934 B2 | 3/2011 | Vetro et al. | |
| 8,035,704 B2 * | 10/2011 | Hu ..................... | H04N 5/3675 348/246 |
| 8,305,456 B1 | 11/2012 | McMahon | |
| 8,315,476 B1 | 11/2012 | Georgiev et al. | |
| 8,471,920 B2 | 6/2013 | Georgiev et al. | |

(Continued)

OTHER PUBLICATIONS

Yu, Zhan, et al. "An analysis of color demosaicing in plenoptic cameras." Computer Vision and Pattern Recognition (CVPR), 2012 IEEE Conference on. IEEE, 2012.*

(Continued)

*Primary Examiner* — Andrae S Allison
(74) *Attorney, Agent, or Firm* — Gordon Kessler

(57) ABSTRACT

A method and apparatus for creating an adaptive mosaic pixel-wise virtual Bayer pattern. The method may include receiving a plurality of monochromatic images from an array of imaging elements, creating a reference ordered set at infinity from the plurality of monochromatic images, running a demosaicing process on the reference ordered set, and creating a color image from the demosaiced ordered set. One or more offset artifacts resulting from the demosaicing process may be computed at a distance other than infinity, the ordered set may be modified in accordance with the computed offsets.

21 Claims, 17 Drawing Sheets
(7 of 17 Drawing Sheet(s) Filed in Color)

(56) References Cited

U.S. PATENT DOCUMENTS

| | | | |
|---|---|---|---|
| 8,471,921 B1* | 6/2013 | Li | H04N 9/045 348/222.1 |
| 8,761,504 B2* | 6/2014 | Hirakawa | G06T 1/0007 348/273 |
| 9,207,759 B1 | 12/2015 | El Dokor | |
| 2004/0001641 A1* | 1/2004 | Guenter | G06T 3/4015 382/260 |
| 2004/0114807 A1 | 6/2004 | Lelescu et al. | |
| 2005/0200733 A1* | 9/2005 | Malvar | G06T 3/4015 348/272 |
| 2006/0072814 A1 | 4/2006 | Messina | |
| 2006/0177150 A1 | 8/2006 | Uyttendaele | |
| 2008/0043095 A1 | 2/2008 | Vetro et al. | |
| 2008/0193026 A1 | 8/2008 | Horie et al. | |
| 2008/0240559 A1* | 10/2008 | Malvar | G06T 3/4015 382/167 |
| 2010/0141802 A1 | 6/2010 | Knight et al. | |
| 2010/0182466 A1* | 7/2010 | Chang | G06T 3/4007 348/273 |
| 2012/0281072 A1 | 11/2012 | Georgiev et al. | |
| 2013/0121615 A1 | 5/2013 | Intwala | |
| 2013/0127901 A1 | 5/2013 | Georgiev | |
| 2013/0128087 A1 | 5/2013 | Georgiev et al. | |
| 2015/0042775 A1* | 2/2015 | Zhao | G06T 3/4015 348/71 |

OTHER PUBLICATIONS

Yosuke Bando, Bing-Yu Chen, and Tomoyuki Nishita. 2008. Extracting depth and matte using a color-filtered aperture. ACM Trans. Graph. 27, 5, Article 134 (Dec. 2008), 9 pages.

Barnard, K., Cardei, V., & Funt, B. (2002). A comparison of computational color constancy algorithms—Part I: Methodology and experiments with synthesized data. *IEEE Trans. Image Processing*, 11 (9), 972-984.

Bleyer, M., Rother, C., & Kohli, P. (2010). Surface Stereo with Soft Segmentation. *Computer Vision and Pattern Recognition*. IEEE.

Chen, J., T.N., P., A., M., & B.E., R. (2005). Adaptive perceptual color-texture image segmentation. *IEEE Transactions on Image Processing*, 4 (0), 1524-4536.

Farsiu, S., Elad, M., & Milanfar, P. (2006). Multi-Frame Demosaicing and Super-Resolution of Color Images. *IEEE Transactions on Image Processing*. vol. 15, No. 1.

Fife, K.; El Gamal, A.; Wong, H.-S.P., "A 3D Multi-Aperture Image Sensor Architecture," Custom Integrated Circuits Conference, 2006. CICC '06. IEEE , vol., No., pp. 281,284, Sep. 10-13, 2006.

Stereopsis. In D. A. Forsyth, & J. Ponce, *Computer Vision a Modern Approach*. Prentice Hall.

Freeman, W. T., & Adelson, E. (1991). The design and use of steerable filters. *IEEE Transactions on Pattern Analysis and Machine Intelligence*, 13, 891-906.

Gallo, O., Tico, M., Manduchi, R., Gelfand, N., & Pulli, K. (2012). Metering for Exposure Stacks. 31. Cagliari: Eurographics.

Gijsenij, A., Gevers, T., & Weijer, J. (2011). Computational Color Constancy: Survery and Experiments. *IEEE Trans. Image Processing*, 20 (9), 2475-2489.

Grossberg, M. D., & Nayar, S. K. (2003). High Dynamic Range from Multiple Images: Which Exposures to Combine? *ICCV Workshop on Color and Photometric Methods in Computer Vision (CPMCV)*. Nice: ICCV.

Grossberg, M. D., & Nayar, S. K. (2003). What is the Space of Camera Response Functions? *Proceeding of the IEEE Conference on Computer Vision and Pattern Recognition*. IEEE.

Harris, M., Sengupta, S., & Owens, J. D. (2007). Parallel Prefix Sum (Scan) with CUDA. In H. Nguyen (Ed.), *GPU Gems 3* (vol. 39).

Hirschmuller, H. (2006). Stereo Vision in Structured Environments by Consistent Semi-Global Matching. *Computer Vision and Pattern Recognition, CVPR 06*, (pp. 2386-2393).

Holloway, J.; Mitra, K.; Koppal, S.J.; Veeraraghavan, A.N., "Generalized Assorted Camera Arrays: Robust Cross-Channel Registration and Applications," Image Processing, IEEE Transactions on , vol. 24, No. 3, pp. 823,835, Mar. 2015.

Ivekovic, S., & Trucco, E. (2004). Dense Wide-baseline Disparities from Conventional Stereo for Immersive Videoconferencing. *ICPR*, 4, pp. 921-924.

Kaldewey, T., Hagen, J., Di Blas, A., & Sedlar, E. (2009). Parallel Search on Video Cards, *First USENIX Workshop on Hot Topics in Parallelism (HotPar '09)*.

Kirk, D., & Hwu, W.-M. W. (2010). *Programming Massively Parallel Processors a Hands-on Approach*. Elsevier.

Klaus, A., Sormann, M., & Karner, K. (2006). Segment-Based Stereo Matching Using Belief Propagation and a Self-Adapting Dissimilarity Measure. *Proceedings of ICPR 2006*(pp. 15-18). IEEE.

Kolmogorov, V., & Zabih, R. (2001), Computing Visual Correspondence with Occlusions via Graph Cuts. *International Conference on Computer Vision*.

Kolmogorov, V., Zabih, R., & Gortler, S. (2003). Generalized Multi-camera Scene Reconstruction Using Graph Cuts. *Proceedings fo the International Workshop on Energy Minimization Methods in Computer Vision and Pattern Recognition*.

Kuhn, M., Moser, S., Isler, O., Gurkaynak, F. K., Burg, A., Felber, N., et al. (2004). Efficient ASIC Implementation of a Real-Time Depth Mapping Stereo Vision System. *IEEE 2004*, p. 1478-1491.

Lelescu, D., Molina, G., & Venkataraman, K. (2010). U.S. Appl. No. 12/967,807.

Li, S. (2008). Binocular Spherical Stereo. *IEEE Transactions on Intelligent Transportation Systems*, 9 (4), 589-600.

Lu, J., Zhang, K., Lafruit, G., & Catthoor, F. (2009). Real-Time Stereo Matching: A Cross-Based Local Approach. *2009 IEEE International Conference on Acoustics, Speech and Signal Processing*. IEEE.

Marszalek, M., & Schmid, C. (2007). Semantic hierarchies for visual object recognition. *Proceedings of IEEE Conference on Computer Vision and Pattern Recognition, 2007. CVPR '07*(pp. 1-7). MN: IEEE.

Metzger, W. (2006). *Laws of Seeing*. MIT Press.

*Middlebury Stereo Vision*. (2010). From Middlebury Stereo Vision Page: http://vision.middlebury.edu/stereo/.

Min, D., & Sohn, K. (2008). Cost Aggregation and Occlusion Handling With WLS in Stereo Matching. (IEEE, Ed.) *IEEE Transactions on Image Processing*, 17, 1431-1442.

Nguyen, N. (2000). *Numerical Algorithms for Image Superresolution*. Stanford Univeristy.

Nguyen, N., Milanfar, P., & Golub, G. (2001). Efficient Generalized Cross-Validation with Applications to Parametric Image Restoration and Resolution Enhancement. *IEEE Transactions on Image Processing*, 10 (9), 1299-1308.

Y. Nomura, L. Zhang and S.K. Nayar, "Scene Collages and Flexible Camera Arrays," Proceedings of Eurographics Symposium on Rendering, Jun. 2007.

NVIDIA: CUDA compute unified device architecture, prog. guide, version 1.1 . (2007).

Remondino, F., El-Hakim, S. F., Gruen, A., & Zhang, L. (2008). Turning Images into 3-D Models. *IEEE Signal Processing Magazine*, 55.

Richardson, I. E. (2003). H.264/MPEG-4 Part 10 White Paper. *White Paper*/www.vcodex.com.

Sengupta, S., Harris, M., Zhang, Y., & Owens, J. D. (2007), Scan Primitives for GPU Computing. *Proceedings of the 2007 Graphics Hardware Conference*, (pp. 97-106). San Diego, CA.

Sintron, E., & Assarson, U. (2008). Fast Parallel GPU-Sorting Using a Hybrid Algorithm. *Journal of Parallel and Distributed Computing*, 68 (10), 1381-1388.

Toro, J., & Funt, B. B. (2007). A multilinear constraint on dichromatic planes for illumination estimation. *IEEE Trans. Image Processing*, 16 (1), 92-97.

Wang, Z.-f., & Zheng, Z.-G. (2008). A Region Based Stereo Matching Algorithm Using Cooperative Optimization. *CVPR*.

Wei, Z., & Jaja, J. (2010). Optimization of Linked List Prefix Computations on Multithreaded GPUs Using CUDA. *2010 IEEE International Symposium on Parallel & Distributed Processing (IPDPS)*. Atlanta: IEEE.

(56) References Cited

OTHER PUBLICATIONS

Wiegand, T., Sullivan, G. J., Bjøntegaard, G., & Luthra, A. (2003). Overview of the H.264/AVC Video Coding Standard. *IEEE Transactions on Circuits and Systems for Video Technology*, 13 (7), 560-576.

Woodford, O., Torr, P., Reid, I., & Fitzgibbon, A. (2009). Global Stereo Reconstruction under Second Order Smoothness Priors. *IEEE Transactions on Pattern Analysis and Machine Intelligence*, 31 (12), 2115-2128.

Yang, Q., Wang, L., Yang, R., Stewenius, H., & Nister, D. (2009). Stereo Matching with Color-Weighted Correlation, Hierarchical Belief Propagation, and Occlusion Handling. *IEEE Transactions on Pattern Analysis and Machine Intelligence*, 31 (3), 492-504.

Zinner, C., Humenberger, M., Ambrosch, K., & Kubinger, W. (2008). An Optimized Software-Based Implementation of a Census-Based Stereo Matching Algorithm. *Lecture Notes in Computer Science*, 5358, 216-227.

Z. Yu, J. Yu, A. Lumsdaine, and T, Georgiev. An analysis of color demosaicing in plenoptic cameras. In Computer Vision and Pattern Recognition (CVPR), IEEE Conference on, pp. 901-908. IEEE 2012.

Neus Sabater, Valter Drazic, Mozhdeh Sei, Gustavo Sandri, Patrick Perez, Light-Field De-multiplexing and Disparity Estimation. 2014.

N. Sabater, M. Seifi, V. Drazic, G. Sandri, P. Perez. Accurate disparity estimation for plenoptic images. ECCV-LF4CV 2014.

D. Capel and A. Zisserman, "Automated mosaicking with super-resolution zoom.," Computer Vision and Pattern Recognition, 1998. Proceedings. 1998 IEEE Computer Society Conference on, Santa Barbara, CA 1998, pp. 885-891.

\* cited by examiner

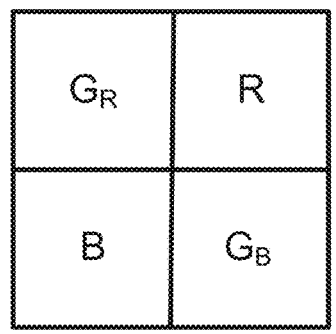
FIGURE 1
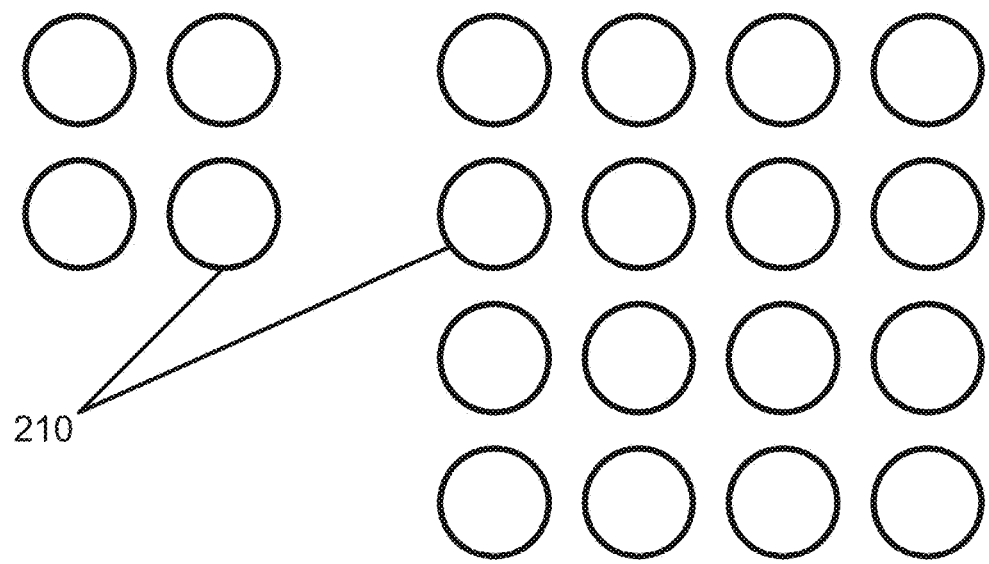
FIGURE 2(a)
FIGURE 2(b)

METHOD AND APPARATUS FOR CREATING AN ADAPTIVE BAYER PATTERN

CROSS REFERENCE TO RELATED APPLICATIONS

This application is a continuation of U.S. patent application Ser. No. 14/925,039 filed Oct. 28, 2015 to El Dokor et al., titled "Method and apparatus for Creating an Adaptive Mosaic Pixel-Wise Virtual Bayer Pattern", currently pending, which is a continuation of U.S. patent application Ser. No. 14/045,774 filed Oct. 3, 2013 to El Dokor et al., titled "Method and Apparatus for Generating Depth Map from Monochrome Microlens and Imager Array", now U.S. Pat. No. 9,207,759, which in turn claims the benefit of U.S. Provisional Patent Application Ser. No. 61/711,177, filed Oct. 8, 2012, to Hauptman et al., titled "Multi-zoom Functionality on a Mobile Device", the contents of these applications being incorporated herein by reference.

FIELD OF THE INVENTION

This invention relates generally to a depth perception based Bayer pattern that is derived from a plurality of monochromatic portions of an image sensor, and more particularly to an adaptive Bayer pattern that preferably changes its configuration, depending on depth perception in the field of view. One or more reference Bayer patterns are preferably generated, and an adaptive demosaicing scheme may be computed from the Bayer pattern as part of an image processing pipeline.

BACKGROUND OF THE INVENTION

Camera lens arrays have become more popular with the introduction of such designs by Pelican Imaging and as used in the Lytro camera. Approaches exploiting camera and lens arrays mostly deal with developing super resolution techniques that try to discern more accurate, higher resolution images from lower resolution, mostly color-sensitive images. But none of these approaches provide a novel way for discerning depth from such a camera lens array that is power-efficient and cost-friendly.

Therefore, it would be beneficial to provide an improved approach that overcomes the drawbacks of the prior art.

SUMMARY OF THE INVENTION

In accordance with one or more embodiments of the present invention, as is shown in FIG. 1, a sensor array including sensor elements for RGB (Red, Green 1, Green 2, Blue) is shown. FIG. 2 depicts two different microlens/sensor array example formats, each circular element 210 preferably comprising a sensor array as shown in FIG. 1. FIG. 2a shows an array including a total of 4 such sensors in a 2×2 format, while FIG. 2b shows a more complex sensor array, effectively comprising 16 versions of the sensor shown in FIG. 1 in a 4×4 format. While the arrays described herein and throughout the application are preferably a microlens array, any array of cameras, lenses or the like may be employed, as long as providing relative position changes between the various elements of the sensor array configuration.

In accordance with one or more embodiments of the invention, a Synthetic Bayer pattern is preferably produced from a series of observations by combining all of the different observations into a new set—a novel method in which the Bayer pattern is synthetically reconfigured, per-pixel to generate a color image.

In accordance with the various embodiments of the present invention, given a set of monochromatic images representing the set of primary color Low Resolution (LR) images, the inventive solution strives to rearrange the set of LR pixel elements belonging to each LR image, so that a mosaic pixel-element pattern can be generated corresponding one-to-one to each element from the LR elements. This is very different from various well known super resolution techniques (as will be described in greater detail below) in that the various embodiments of the present invention do not strive to look for a High Definition (HD) grid. Instead of employing such an HD grid, embodiments of the present invention define a virtual color image that can be constructed by demosaicing a Bayer pattern that can be extracted from some arrangement of the pixel elements, and knowing that such an arrangement is contingent upon correctly matching the various light-sensitive pixel elements. The inventive approach further assumes that there is no fixed pixel-wise element set that can be used across all frames. Rather, a pixel-wise arrangement referred to as an adaptive, or synthetic, Bayer pattern, will change nearly every frame.

In accordance with one or more embodiments of the present invention, the inventors of the present invention have recognized that smartphones typically come standard with a front-facing camera as well as a back-facing camera. The inventors of the present invention have therefore determined that when a user is viewing data from the back-facing camera, it may be useful to employ the front-facing camera to extract critical information from the field-of-view and produce a touchless device that establishes a gestural interface.

In accordance with the various embodiments of the present invention a dual-pair of front-facing cameras may be employed. One camera may be at a higher resolution than the other camera. For instance, one camera may be at 1080p, while the second camera may have VGA resolution. See FIGS. 1 and 2 for an illustration of a front-facing dual sensor device. Thus, providing multiple front facing sensors may be employed.

Still other objects and advantages of the invention will in part be obvious and will in part be apparent from the specification and drawings.

The invention accordingly comprises the several steps and the relation of one or more of such steps with respect to each of the others, and the apparatus embodying features of construction, combinations of elements and arrangement of parts that are adapted to affect such steps, all as exemplified in the following detailed disclosure, and the scope of the invention will be indicated in the claims.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

For a more complete understanding of the invention, reference is made to the following description and accompanying drawings, in which:

FIG. 1 depicts a sensor;

FIGS. 2(a) and 2(b) depict alternative configurations of a sensor array to be employed in accordance with one or more embodiments of the present invention;

DETAILED DESCRIPTION OF THE PREFERRED EMBODIMENTS

One or more embodiments of the invention will now be described, making reference to the following drawings in which like reference numbers indicate like structure between the drawings.

Figure 3:
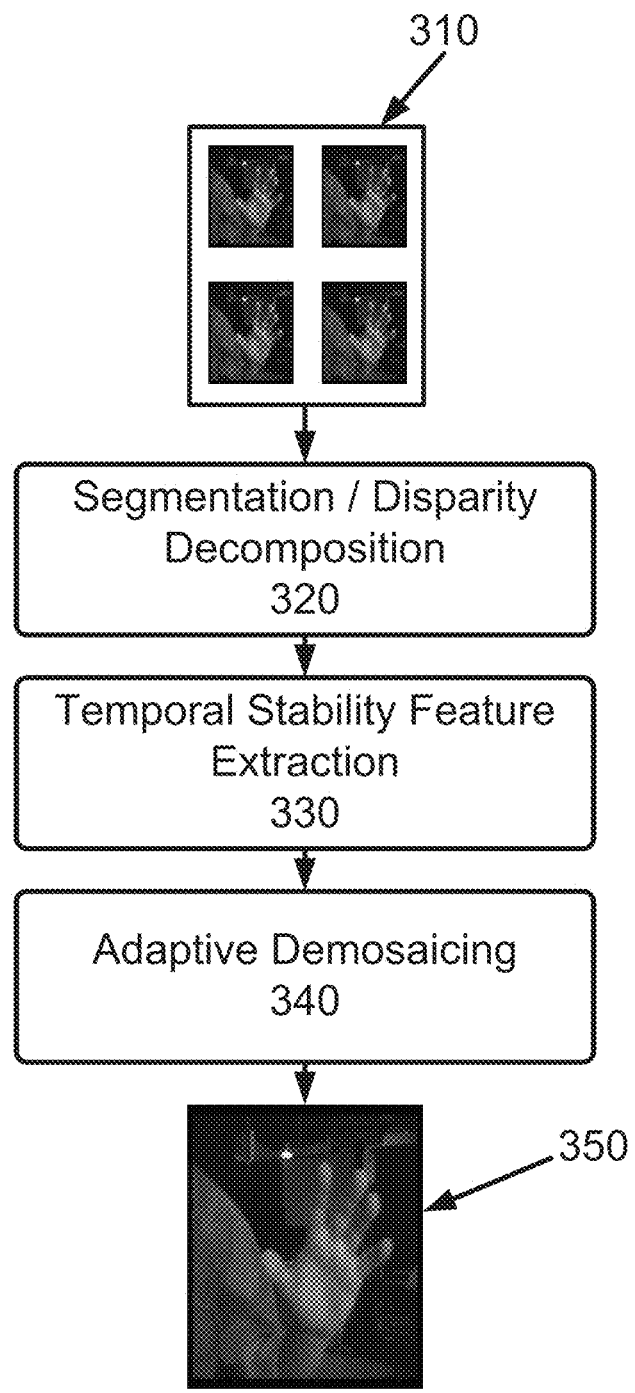
FIG. 3 is a flowchart diagram depicting an adaptive demosaicing processing accordance with an embodiment of the invention.

The inventors of the present invention have determined that using imaging data from the noted image sensor arrays of FIG. 2 (the various embodiments of the invention will be described making use of the 2×2 array of FIG. 2(a), although the concepts of the invention are applicable to any array configuration), parallax provided by the locations of the different sensor elements of the array may be exploited to generate depth information. Thus as noted above and as is further shown in FIG. 3, by employing monochrome images 310 from each of the sensor array positions, overlaying of these images provides parallax information indicative of depth information of the scene. Through the performance of segmentation and disparity decomposition at step 320, temporal stability feature extraction at step 330, and adaptive demosaicing at step 340, a final image 350 may be provided. Thus, the determined depth information may be employed to generate an adaptive demosaicing scheme. The inventors of the present invention have determined the following:

1. If one looks from far enough away in a field-of-view of an array camera or of a microlens array sensor such as the one described in accordance with the various embodiments of this invention, then all of the pixel elements from any of the sensor arrays will view the same scene. In other words, at infinity, all the pixel-element data from the various sensors subtend the same set of locations in the scene. This allows some practical conclusions that define an infinity distance, and that allow for setting up a reference frame for use in determining parallax and depth information in a scene.

2. Providing a set of data that is subdivided into four monochromatic images also helps reduce cross talk between the channels and provides cleaner pixels.

3. While there have been many super resolution approaches to resolving the problem of depth as well as the convergence of a Bayer pattern with depth to produce an acceptable demosaicing result, most of the approaches dramatically lower resolution of the final data set, i.e. relative the total number of starting pixels, and are computationally very taxing.

4. If a Bayer subimage pattern is used for generation of monochrome subimages, then an ordered set of pixels can be generated to represent the background image, by transforming the Bayer pattern into an ordered set at the pixel level of interest.

5. Defining a set of four monochromatic images, comprised of primary colors, like, for instance two green, one blue and one red, creates that ordered set that will be used as a composite pixel-level Bayer pattern in accordance with the various embodiments of the invention.

6. Lining up the green images for disparity offsets effectively helps in lining up the red and blue images as well, since they are epipolar with one of the two existing images.

7. If one starts looking at objects that are a located a little closer to the sensor as compared to the infinity distance produced image, the demosaicing process produces artifacts that are apparent and easy to extract.

8. Re-aligning the pixel-wise synthetic Bayer pattern can help get rid of such artifacts and aid in producing a crisp image.

9. One can then define a new ordered set that varies row-wise, and column-wise, comprised of subsets of the four monochromatic images.

10. If one follows these observations, then one is in no need of a high-resolution coordinate grid, as defined in prevalent SR and image restoration techniques. In fact, such a grid becomes cumbersome to build and maintain.

The various embodiments of the present invention also present gesture functionality with a mobile device using such a camera or a pair of front-facing cameras. The device can be a smartphone or a tablet. The user is able to use gestures to enable the device with multiple zoom functionality. As an example, in a camera application, the user is able to use a three-dimensional pinch gesture to zoom, or a thumbs-up gesture to snap a picture. A number of applications are presented in this work as well as illustrations for such applications. Novel three-dimensional eye tracking with multiple degrees of freedom is also proposed.

Therefore, in accordance with the elements determined by the inventors of the present invention noted above, a method and system for generating one or more adaptive Bayer patterns from one or more monochrome images is provided.

Given a set of monochromatic images that are light sensitive to different components of the wavelength, a well-ordered set of pixel-element patterns that minimizes the error between the current constructed set, and another set generated while viewing the scene through the same complex sensor pattern at infinity is generated in accordance with one or more embodiments of the present invention. Specifically, one can generate a set of patterns that mitigate that error, and if so, use this information to determine depth information to be employed in an adaptive demosaicing process. In order to employ the inventive system and method, one must first construct a reference image. As noted above, for construction of the reference image, as well as during later use of the system to generate depth information, four different images are preferably obtained from a micro lens (or other camera) array.

Figure 4:
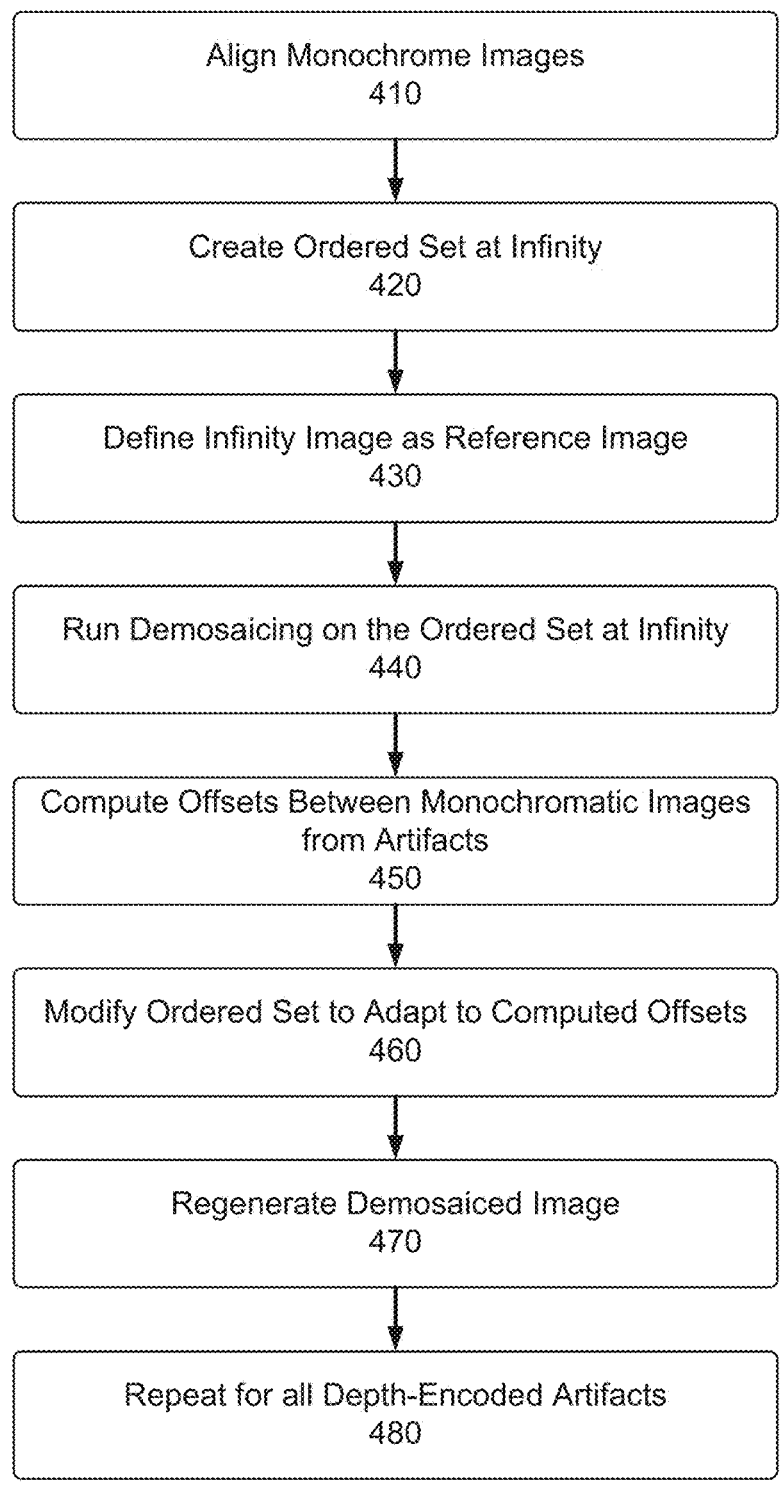
FIG. 4 is a flowchart diagram depicting an overall method in accordance with an embodiment of the invention.

Referring next to FIG. 4, a flowchart depicting an overall method in accordance with an embodiment of the invention is shown. One or more of the steps shown in FIG. 4 may be omitted or reordered as desired in accordance with alternative embodiments of the invention. As is shown in FIG. 4, an inventive new pixel-based synthetic Bayer pattern is generated from a set of four monochromatic images. This synthetic Bayer pattern has a resolution that is approximately the resolution of the original sensor, after adding up all of the pixel elements. As is shown in FIG. 4, an initial image at infinity is first generated, by setting up a pixel-wise ordered set from all four light-sensitive images, assumed to be at infinity. In step 410, a plurality of monochrome images, generated from data received by each of a plurality of sensor elements in a sensor array (as described above) are aligned. An ordered set of images is then created at infinity in step 420. This infinity image is then defined as the reference image in step 430. Demosaicing is then performed on the ordered set at infinity in step 440. Note that the ghosting artifacts will exist on the data. In spite of the artifacts, salient scene information can still be extracted from the ordered set, and thus offsets are computed between the monochromatic images from artifacts in step 450. For instance, one such type of information may include skin pixels. Because of the artifacts, not all of the skin pixels can be extracted at one time, however, one can extract a significant number of them, enough to localize the rest of the steps in the process to a region or regions in the field-of-view.

This step is then followed by the process of modifying the ordered set to adapt to the computed offsets in step 460, and is achieved by segmentation/disparity decomposition, in which regions in each of the monochrome images are first segmented, and then their disparities are computed. Temporal stability analysis as well as other salient features extraction is then attempted. Once the disparity that is associated with every pixel in the scene is known, one can then modify the initial infinity-based ordered set to produce a new demosaiced ordered set at step 470, based on the disparity computation. This new ordered set will then constitute a final version of the image for that particular frame. The whole process is then attempted again for each frame at step 480. This is desirable, since objects move in the field-of-view, and hence, it is important to take that aspect into account in an adaptive demosaicing Bayer pattern.

Details of each of the steps noted above in FIG. 4 will now be described in greater detail.

Generating the Reference Image

As noted with reference to FIG. 4, an ordered set of data is obtained from the images generated from the sensor array, in this case four images, such that an initial Bayer pattern is obtained. After performing steps 410, 420 and 430 in FIG. 3, this Bayer pattern is then used to demosaic the ordered set at infinity in step 440 producing R, G, and B colors. For instance, if one is presented with a 2×2 set of monochromatic images from a microlens array, then one can represent the image at infinity as:

$$I_\infty(x,y,\infty) = \{I_R(x,y), I_{g_r}(x+1,y), I_B(x,y+1), I_{g_b}(x+1,y)\}$$

Once this ordered set is generated then demosaicing can be computed and the individual R, G, and B channel images may then be generated.

Figure 5:
FIG. 5 depicts a reference image generated at an infinity distance from an object in accordance with an embodiment of the invention.

Consider then, this generated image at infinity, an example of which is depicted in FIG. 5, as the reference image. It is an image in which all of the datasets are lined up near perfectly at infinity, and the ordered set generates a perfectly aligned image at that depth. Note that infinity may be a few inches or a few kilometers, depending on the image capture apparatus, scene, colors, optics, etc. The assumption for reaching infinity is that one can generate an ordered set that represents a reference image from four neighboring images can then hold true, and can be used.

In a way, this reference background image is one of a set of images whose dimensions approximately equate to that of the four images, put together, i.e. 4× the original dimensions. This image also represents the point beyond which all images look fairly identical to each other, once demosaicing takes place after sufficient white balancing between the different images. One is then able to generate an ordered set at infinity; more importantly, one has the ability to use this image as a reference image, since it represents the ordered set at infinity, hence every other image taken at other than infinity will have components offset from it. Once demosaicing is performed on the infinity-ordered set, every other image that is generated at other than infinity henceforth will have depth-related artifacts resulting from any subsequent demosaicing processes that take place.

Identifying Depth from Demosaicing Artifacts

If a reference image, I, is well-ordered and clearly generated in RGB at infinity, as shown in FIG. 5, then the assumption holds that it would have various artifacts at almost any other depth that is discernable, since the monochrome images generating the RGB image would not line up with each other as correctly at any other depth. In accordance with the various embodiments of the present invention, the farther the depth value is from the background image, i.e. the closer an object or parts of an image are to the imager, the greater the number of artifacts that can be interpreted into discernible disparity, and hence, depth, information.

Defining a "Discernible" Depth

Figure 6:
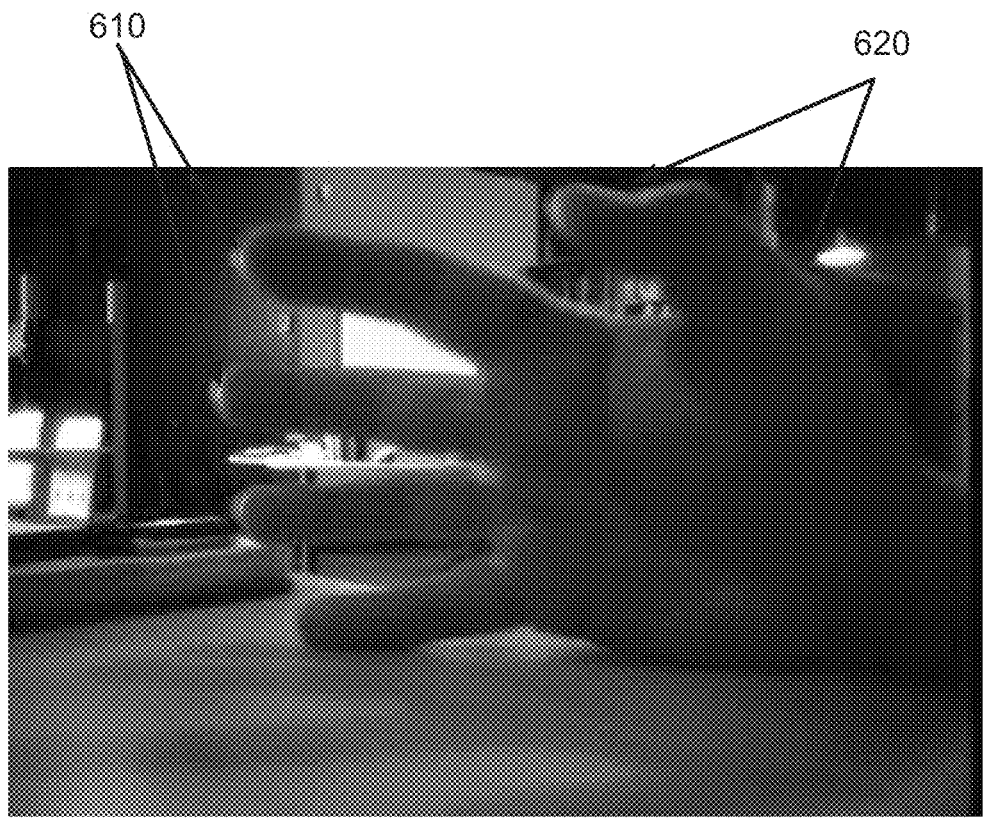
FIG. 6 depicts monochromatic artifacts of an object at less than an infinity distance in accordance with an embodiment of the invention.
Figure 7:
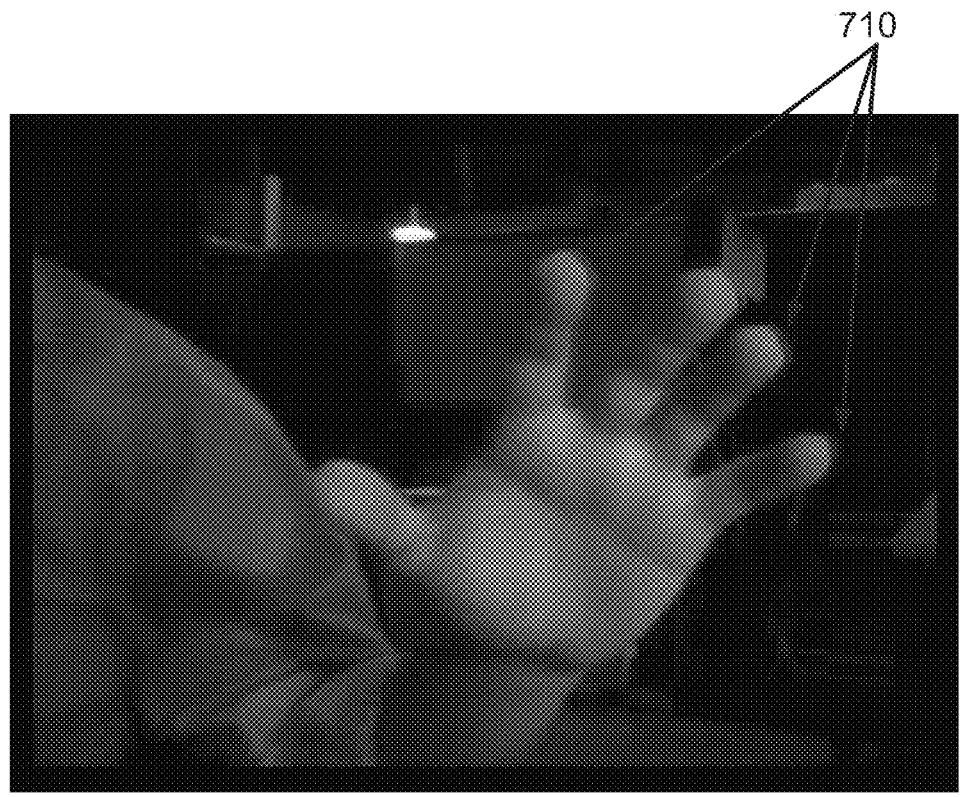
FIG. 7 further depicts additional monochromatic artifacts of an object at less than an infinity distance in accordance with an embodiment of the invention.
Figure 8:
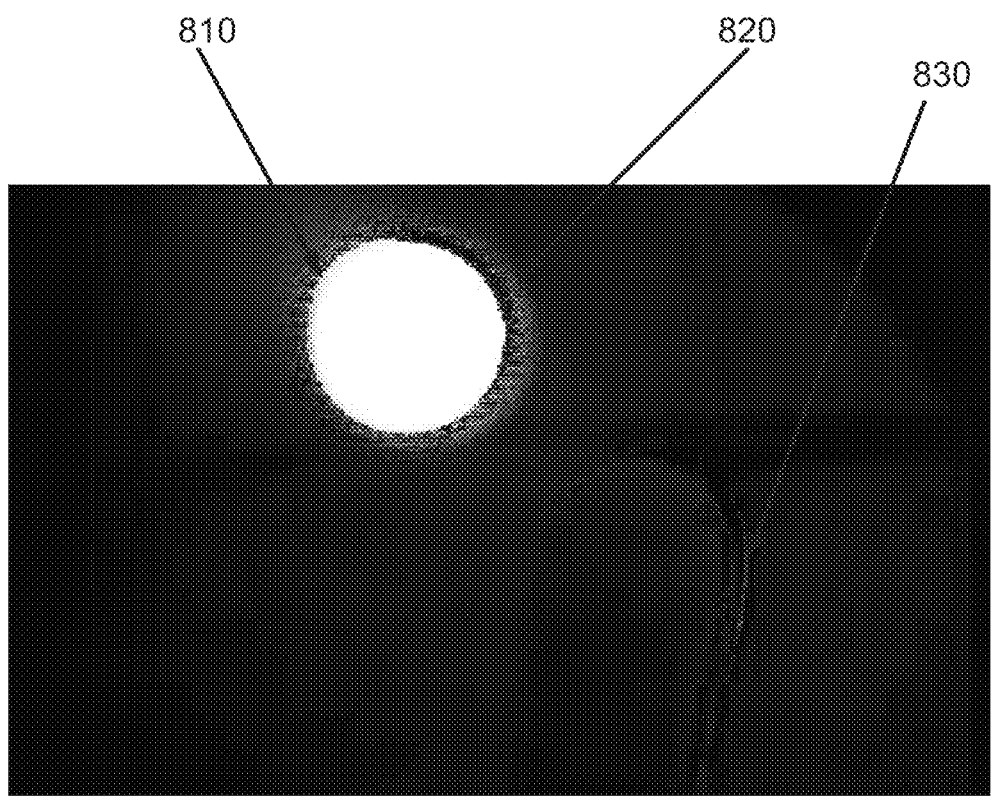
FIG. 8 depicts an initial RGB image with monochrome-encoded alignment offsets in accordance with an embodiment of the invention.
Figure 9:
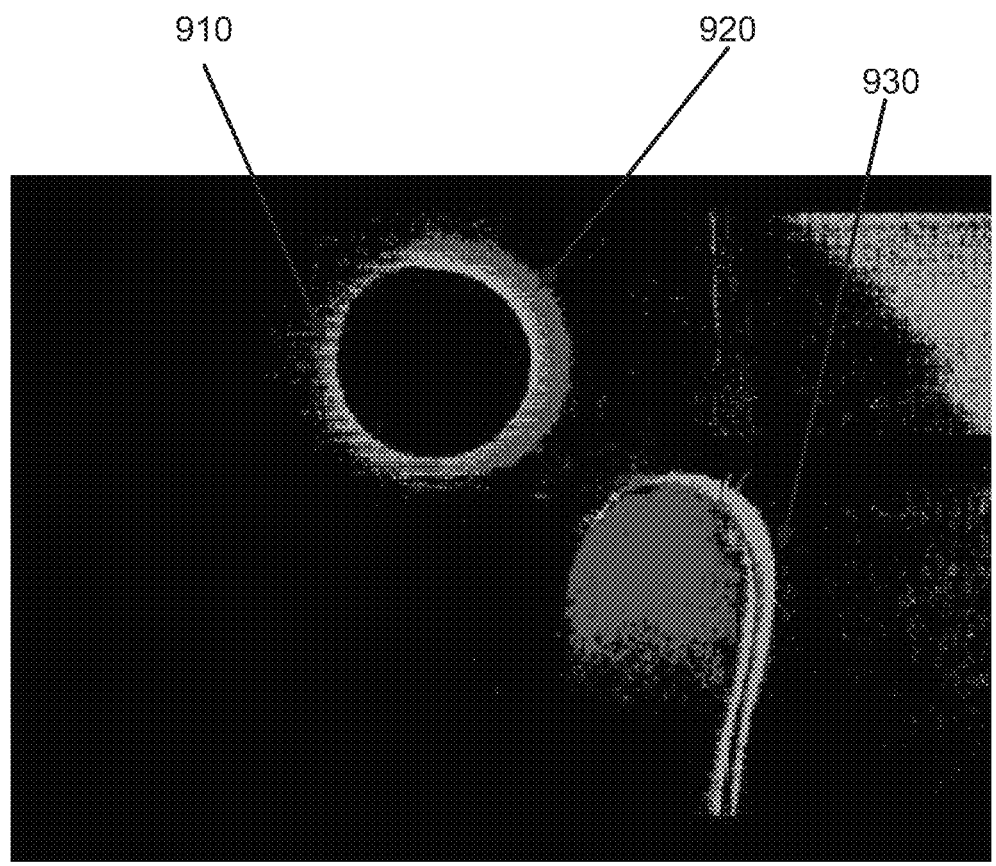
FIG. 9 depicts corresponding segmented ghosting artifacts/offsets due to misalignment in accordance with an embodiment of the invention.

In accordance with the one or more embodiments of the invention, the inventors have determined that an artifact is generated when object boundaries don't line up between two or more of the four component images when these images are taken at a depth other than infinity. For instance, referring next to FIGS. 6 and 7, a background image is first generated from an ordered set (see FIG. 5 above), and then it is observed what happens when one brings a subject's hand closer to the imaging apparatus in the field-of-view. As is shown in FIG. 6, one or more monochromatic green artifacts 610 are shown around the fingers on the left-hand side, while one or more monochromatic red artifacts 620 are shown on the right-hand side. In FIG. 7, similar artifacts 710 can be seen. FIG. 8 additionally depicts an initial RGB image with monochrome-encoded alignment offsets 810, 820 and 830. FIG. 9 depicts corresponding segmented ghosting artifacts/offsets 910, 920 and 930 also due to misalignment. The determination of such misalignment, and thus a discernible depth, may take place in real time. Such real time processing to determine these artifacts need only be performed on changes in an image from the prior image. Thus, in accordance with an embodiment of the invention, misalignment artifacts are preferably only computed from regions or pixels in the image that have changed since the prior image. The rest of the image can be synthetically carried over and need not be searched for such misalignment artifacts.

Figure 10:
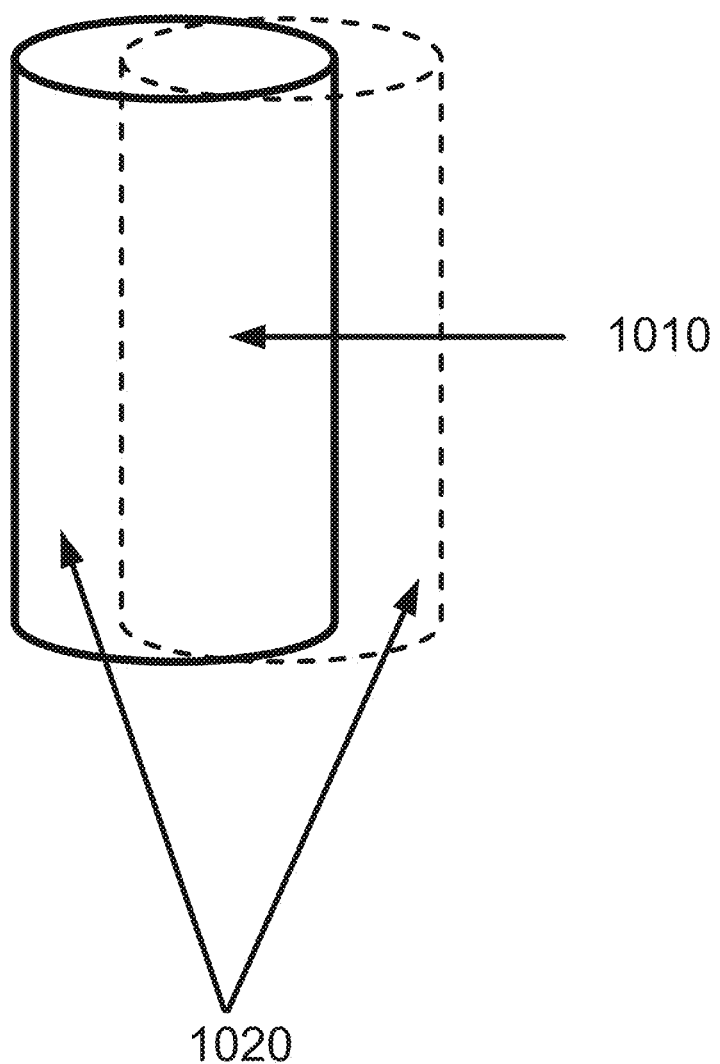
FIG. 10 illustrates the overlap between images generated from pixel-wise synthetic Bayer patterns at infinity and at a second ordered set from a different set of disparity offsets in accordance with an embodiment of the invention.

FIG. 10 illustrates the overlap between images generated from pixel-wise synthetic Bayer patterns at infinity and at a second ordered set from a different set of disparity offsets. As is shown in FIG. 10, a region 1010 represents a section of a difference image that is common between the two common component images (i.e. in FIGS. 6-9, the non-ghosted or artifact portion of the image). Regions 1020 therefore represent the non-overlapping portions of the component images (i.e. the artifacts in FIGS. 6-9). Thus, as is shown, some of the regions overlap, while others don't.

Such artifacts inherently point to depth discontinuities, as well as misalignments between the various monochrome images during demosaicing. By measuring the magnitude of the misalignment, in accordance with the various embodiments of the invention, it is possible to measure disparity between the reference image and another image generated from monochromatic images taken at a depth other than at infinity. The monochromatic, green, lining for instance around the fingers visually encodes depth, making it discernable, and relatively easy to extract, and hence also easy to extract depth information therefrom.

Since this image represents the set of a perfectly aligned Bayer pattern, it can be used to extract a perfectly demosaiced image with the three primary color channels.

Encoded Artifacts from Depth-Misaligned Image Sets

As objects present in images taken at a depth other than infinity violate the infinity reference image, and its associated criteria, a new set is preferably used, comprised of modified, row-wise pixel offsets, to adjust the demosaicing algorithm. These artifacts have certain advantages, allowing for the further features of the present invention to be utilized:

1. As noted above with respect to FIGS. 5 and 6, these artifacts appear as translucent ghost artifacts or sets of ghost artifacts around the boundaries and discontinuities of various objects.

2. These artifacts are clearly delineated, and can easily be extracted, since they characteristically are comprised of monochromatic color offsets.

3. The width and height of these artifacts indicate disparity values in the horizontal and vertical directions respectively.

4. Building on this last point, being able to discern depth in multiple dimensions is another advantage of this lens configuration.

However, the main difference between prior art super resolution techniques in existence and the embodiments of the present invention is that the present invention does not strive to "fill in the blanks" of missing data. Instead, it is assumed that there exists a set of locations for every (x,y) value in the image, as will be described below in greater detail.

Adaptive Demosaicing and Generation of a Synthetic Bayer Pattern

The process for adaptive demosaicing will now be described in greater depth, in accordance with the various embodiments of the present invention. Given four $$\left(\frac{n}{2} \times \frac{m}{2}\right)$$

monochromatic source images, an $l_1 \times l_2$ set of images can be generated with a resolution of approximately (n×m, approximately four-times the resolution of the original set of images. Where $l_1$ represents the total set of horizontal disparity images, and $l_2$ represents the total set of vertical disparity images. A total of approximately ($l_1 \times l_2 \times n$) pixels is generated.

This is accomplished by first creating a single n×m ordered set at infinity, as described above with respect to FIG. 4, and then aligning in both the vertical and horizontal dimensions. To successfully keep the images aligned, producing crisp demosaicing, depth estimation is preferably constantly undertaken in tandem with demosaicing.

Consider the set, S representing the entire set of demosaiced images produced at various depths. One can represent S as the union of all of these candidate images' pixels, such that:

$$S = \{I_{R1,R2}(x,y) \cup I_{1,R2}(x,y) \ldots \cup I_{l_1,R2}(x,y) \ldots \cup I_{R1,1}(x,y) \cup I_{R1,2}(x,y) \ldots \cup I_{R1,l_2}(x,y)\}$$

Visualizing the Set, S

By combining horizontal and vertical displacements, one can see how combinations of shifts within an image can create intermediate versions of the images presented above, by aligning the various disparities across all four images. However, all of these images are presented in the set above. Provided the images are aligned row-wise, one can visualize S in three dimensions, such that multiple pixels occupy the same location, by corresponding to different shifts in the monochromatic sensors.

Note on the Inventive Demosaicing Process

S comprises a bounded set (Gaughan, 1997). Hence, the search space for demosaicing is also bounded, limited by the total number of pixels that one or a combination of the monochromatic images can be shifted by. In accordance with one or more embodiments of the invention, first define the set of monochromatic images M whose dimensions are $$\left(\frac{n}{2} \times \frac{m}{2}\right).$$

Then define a candidate demosaiced image I, such that:
I∈S, the set of all possible demosaiced images.

The candidate demosaicing scheme can belong to one of the images presented above, or a combination of these images.

So, the set of all demosaiced images is known and hence, the set of solutions to the problem of demosaicing.

Computation of the Difference Image Through Disparity Decomposition

Taking advantage of both CPU and GPU computation capabilities that are available on both the CPU and the GPU of a computer or mobile device (although any appropriate processor available may be employed, one can generate disparity decomposition in a manner similar to that described in U.S. patent application Ser. Nos. 12/784,123;

12/784,022; 13/025,038; 13/025,055; 13/025,070; 13/297,029; 13/297,144; 13/294,481; and Ser. No. 13/316,606, the entire contents of each of these application being incorporated herein by reference. Note that disparity decomposition may be performed along the vertical, horizontal, or diagonal directions, as well as any combinations of such directions. The invention also contemplates an alternative approach in which image data is first masked for skin tone providing an initial demosaiced image, and then run through disparity decomposition on the masked images.

Figure 11:
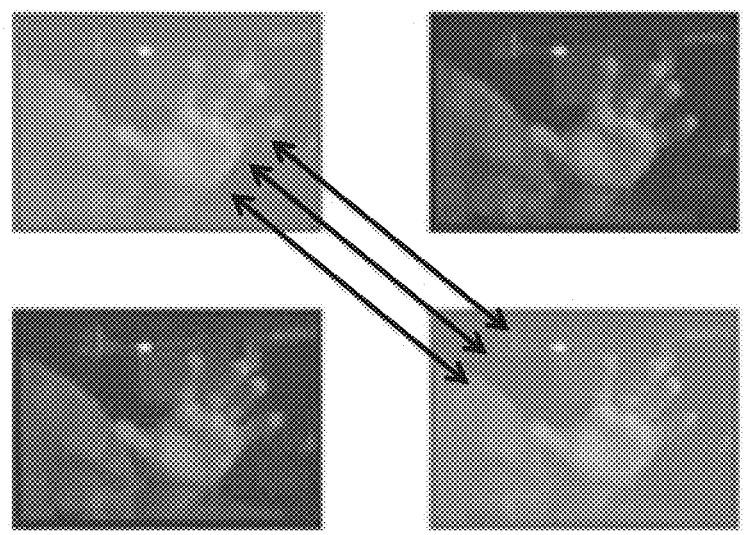
FIG. 11 depicts an example of shifting pixels along the diagonals of an image in accordance with an embodiment of the invention.

Note that in accordance with the invention, it is possible to shift along any direction. So, using the shift along the diagonal allows taking advantage of two LR imagers that are sensitive to the same light color. For instance, one can shift along the diagonals for two green images, thus providing an additional means of computing depth from two identical channels. An example of shifting along the diagonals is presented in FIG. 11

Putting it all Together—Adaptive Real-Time Demosaicing

A new form of demosaicing is then defined in accordance with the various embodiments of the invention, one which adaptively changes a virtual (or synthetic) pixel-wise Bayer pattern that is constantly changing. By realigning depth per-pixel, an updated well-aligned image is always generated that addresses the demosaicing artifacts that are associated with pixel-wise sets as defined in the work.

Operation Under Low Lighting Conditions

Figure 12:
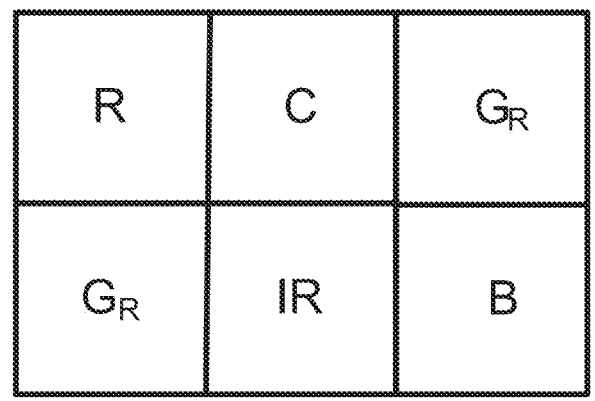
FIG. 12 depicts a clear and IR sensor presented in accordance with an embodiment of the invention.

The concept of a synthetic Bayer pattern can be extended to the operation of the system under low lighting conditions. This can be accomplished by either interleaving a clear or an IR version sensor, or both, with the monochromatic LR sensors. Such an embodiment of the invention is presented in FIG. 12, depicting such a clear and IR sensor, but either one or the other may be exclusively employed.

The standard demosaicing approach can be modified to add a scale factor, based on the response of the pixel-level elements from the clear or IR version. So, the pixel-wise element set, described earlier, can be rewritten as:

$$I_\infty(x,y,\infty)=\{I_R(x,y), I_{g_r}(x+1,y), I_B(x,y+1), I_{g_b}(x+1,y), I_C(x+1,y)\}$$

where $I_C$ represents the contribution from the clear channel image. Note that one of the other channels can be replaced by a clear channel or an IR channel. This is very similar to what has recently been suggested by (Aptina's Clarity+ Solution, 2013). Although this approach moves away from the standard Bayer pattern, it is however in keeping with the Color Filter Array (CFA) configuration that is standard for the utilization of demosaicing algorithms and hence can still have our approach of a synthetic, reconfigurable Bayer pattern be applicable. With a clear LR sensor integrated, the green image is extracted subtractively. More importantly, because the clear sensor is panchromatic, it is able to not only capture a significant component of the green channel, but also capture lower lux values and integrate such values at a significantly greater influence, to produce quality HR and SR images under darker lighting conditions.

Figure 13:
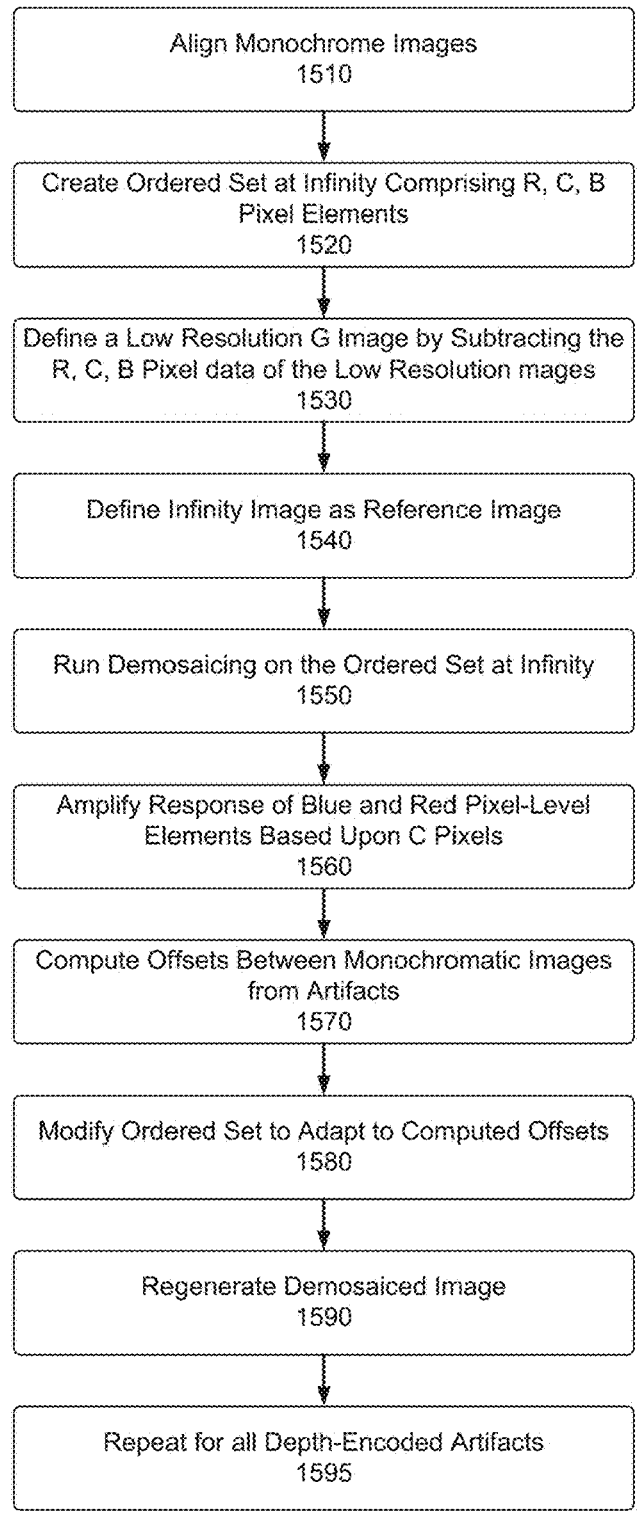
FIG. 13 depicts a flowchart diagram highlighting the extraction of an SR-based image from a set of LR observations, including that of a panchromatic LR sensor, in accordance with an embodiment of the invention.

A block diagram, is presented in FIG. 13 to highlight the extraction of an SR-based image from a set of LR observations, including that of a panchromatic LR sensor. One or more steps from FIG. 13 may be omitted or reordered in accordance with alternative embodiments of the invention. As is shown in FIG. 13, first at step 1510 a plurality of monochrome images, generated from data received be each of a plurality of sensor elements in the sensor array of FIG. 12 is aligned, and at step 1520 an ordered set at infinity of R, C and B pixel elements is created. A low resolution G image is then defined from subtraction of the R, C and B Pixels in step 1530. This infinity image is then defined as the reference image in step 1540. Demosaicing is then performed on the ordered set at infinity in step 1550. The response of the blue and Red pixel level elements are then amplified based upon the C pixel values. Note that the ghosting artifacts will exist on the data. In spite of the artifacts, salient scene information can still be extracted from the ordered set, and thus offsets are computed between the monochromatic images from artifacts in step 1570.

This step is then followed by the process of modifying the ordered set to adapt to the computed offsets in step 1580, and is achieved by segmentation/disparity decomposition, in which regions in each of the monochrome images are first segmented, and then their disparities are computed. Temporal stability analysis as well as other salient features extraction is then attempted. Once the disparity that is associated with every pixel in the scene is known, one can then modify the initial infinity-based ordered set to produce a new demosaiced ordered set at step 1590, based on the disparity computation. This new ordered set will then constitute a final version of the image for that particular frame. The whole process is then attempted again for each frame at step 1595. Temporal stability can also be used to minimize computational demands, i.e. keeping track of only changes in the field of view, per one or more of the applications incorporated by reference noted above. This is preferable, since objects move in the field-of-view, and hence, it is important to take that aspect into account in an adaptive demosaicing Bayer pattern.

Relevance to Super Resolution Techniques

Although the proposed approach defines disparity as per-image, extrapolated patterns of disparity can be achieved from the disparity decomposition image that was defined earlier. Disparity decomposition goes beyond row-wise and column-wise decompositions, and can take the path of any curve that can be defined and traced along the curve's path. This is made possible because once all the decomposition images are created, a complete and ordered set of disparity decompositions can be used to extract the depth map. This is first performed by defining row-wise extracted differences, and then extended to extract intra-row information as well. This is relatively easy to accomplish, so long as the row-wise disparities are well-defined in the prior step of disparity decomposition, as described above. In a sense, a three-dimensional map is generated from the set of LR images, not just a single SR or HR image. Rather, a set of HR images, most of which are not complete due to visual occlusions in the field-of-view are instead generated.

Comparison with Existing Super Resolution (SR) Techniques

Although the technique set forth in accordance with the various embodiments of the present invention is not considered a conventional technique for super resolution, it does produce an image that is of significantly higher resolution than the set of observation images that are associated with the problem at hand. Image super resolution is a discipline of image processing that attempts to generate high-quality, high-resolution images from a set of low-resolution and/or low-quality images (Nguyen, 2000). Most super resolution techniques employ multiframe super resolution, using temporal information to glean and extract further spatial details. Ultimately, the goal of super resolution is to provide for sub-pixel resolution, relative to the coordinate system that is associated with the original dataset, from the set of low-resolution observations/images. The approach set forth in accordance with the various embodiments of the present invention will be contrasted with these prior art super resolution techniques and highlight the uniqueness of the inventive approach relative to these existing super resolution techniques. In (Nguyen, 2000) more conventional super resolution techniques answer the question "Given a set of M×N observations, and a resolution enhancement factor of r, how does one reconstruct an enhanced image rM×rN".

Figure 14:
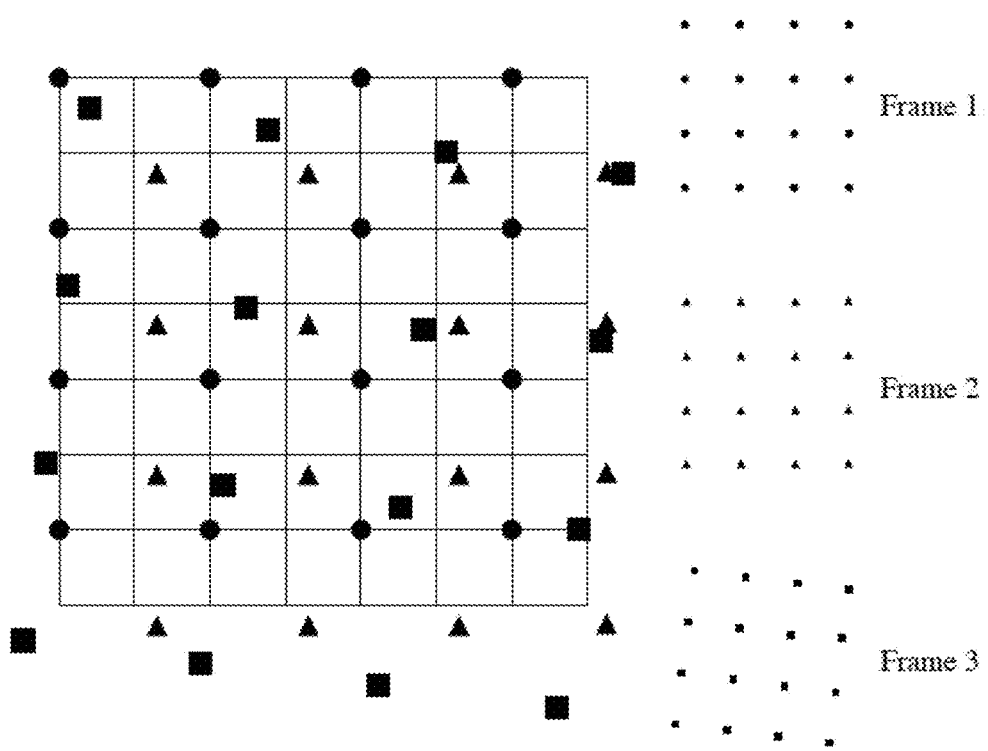
FIG. 14 depicts three frames of low resolution data, offset from each other on a higher resolution grid in accordance with existing super resolution techniques.

The problem is formulated as that of interpolating between a set of data that have been sampled on a theoretical higher-resolution grid. For instance, a low resolution frame, $f_k$, is given by:

$$f_k = DC_k E_k x + n_k, 1 \leq k \leq p$$

where D) is the down-sampling operator, $C_k$ represents the blurring/averaging operator, $E_k$ represent the affine transforms that map the HR grid coordinate system to LR. x is the unknown and ideal HR image, and $n_k$ is additive white noise. We note also that (Nguyen, 2000):

$$f = Hx + n$$

where H would be a complete system matrix with dimensions defined as pMN×r²MN. The dimensions of H are directly related to the number of data samples and unknowns, which is usually a large and computationally cumbersome number. Most approaches of super resolution techniques employ variants to the idea of understanding H, along with what can be extracted and interpolated on a HR grid coordinate system. This computational complexity in the approaches reflects upon attempts aimed at extracting structure, redundancy, as well as irregularities, among other salient features, to try and reduce this highly complex problem into a more manageable problem set. See for example FIG. 14 depicting three frames of low resolution data, offset from each other on a higher resolution grid.

Multichannel Super Resolution

For reasons that are related to the assumed input LR set to the inventive system, multichannel SR will be discussed briefly as well. Multichannel SR is an area of SR that is often referenced, and employs the utilization of various light-sensitive frames with lower resolution imagers, such as low-resolution frames of primary color images that are subtending the same scene. These lower resolution frames generate observations that are slightly offset from one another and can be used to generate a higher resolution image. This is mentioned because one set of inputs to the various approaches in accordance with the present invention consists of such low-resolution primary color frames (red, green, blue).

As noted with respect to FIGS. 2(a) and 2(b) and a setup of a micro lens array, the Bayer pattern that is usually associated with individual pixel elements is replicated on a macro-level. This means that four lenses are placed on top of an image sensor, with four images being generated.

Image Restoration

Figure 15:
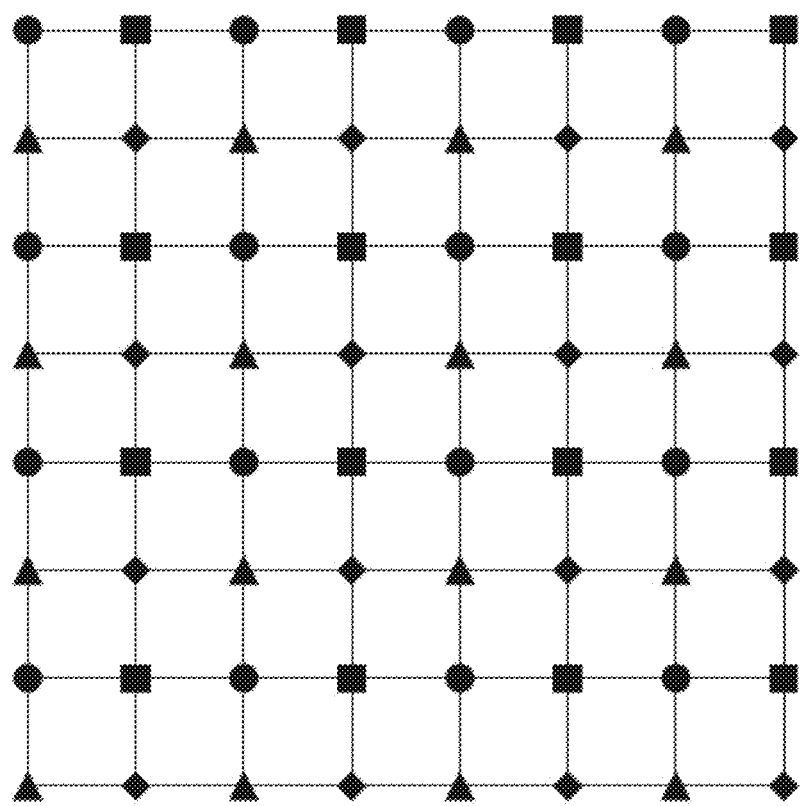
FIG. 15 depicts an ordered set of data on the high resolution grid in accordance with image restoration.

A special case of SR is image restoration, in which an ordered linear set is created from the lower resolution observations through regularly sampled data from the LR images. Image restoration strives to "restore" or rather, rearrange the lower resolution pixels onto a fixed pattern of the high-resolution coordinate grid. An illustration of image restoration is presented in FIG. 15, presenting an ordered set of data on the high resolution grid. The various embodiments of the present invention also differ significantly from image restoration depicted in FIG. 15, as described above.

Figure 16:
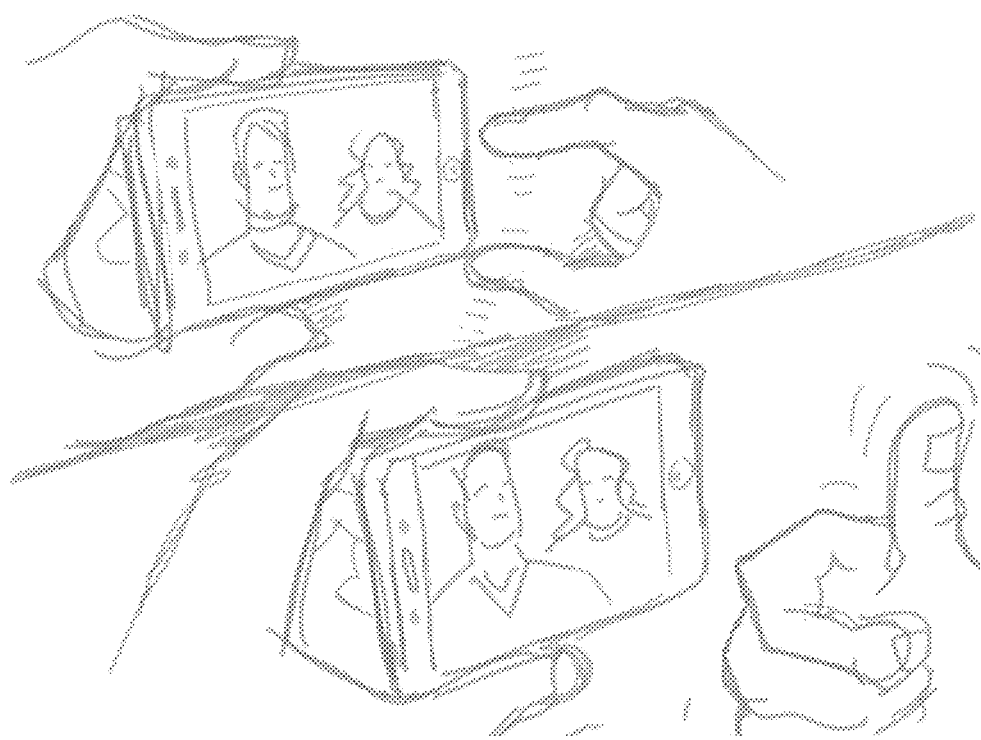
FIG. 16 depicts a picture snapping functionality provided in accordance with n embodiment of the invention.

Application—Manipulating an Image with Front-Facing Camera while Taking a Picture: Pinch and Zoom Functionality Enabling a smartphone with two forward-facing cameras or a micro lens array camera to allow the user to control the zoom action of the camera application by using a pinch gesture in a 3D environment; thus allowing for the user to achieve the appropriate zoom level without having to move the phone from the current location (i.e., not having to touch the screen while actively aiming) or obscuring the screen/objects in FOV See FIG. 16 for an illustration of picture snapping functionality.

Hence, present a method is presented for enabling a smartphone with a microlens array, or alternatively, two forward-facing cameras to allow the user to take pictures by using a set of predefined gestures in a 3D environment, such as a pinch gesture or a thumbs-up gesture. This would allow the user to take faster photos without obscuring the objects in the field of view. Alternatively, users can change the zoom by moving their hand back and forth in the direction of and away from the phone.

Figure 17:
FIG. 17 depicts a picture taking functionality for taking group portraits by gesturing a thumbs-up to the camera while in the field of view on accordance with an embodiment of the invention.

Another implementation in accordance with the present invention involves enabling a smartphone camera with gesture controls to also allow the phone to be used with a tripod so that the user can take self-portraits from a 1 m-3 m distance, so a telescoping tripod attachment to the phone could be sold as an accessory with the gesture application. Dual sensors can also be used instead of microlens array sensors, on the back facing cameras and the user can take group portraits by gesturing a thumbs-up to the camera. See FIG. 17 for an illustration.

Controlling a Mobile Device and Enabling Convergence Applications

Figure 18:
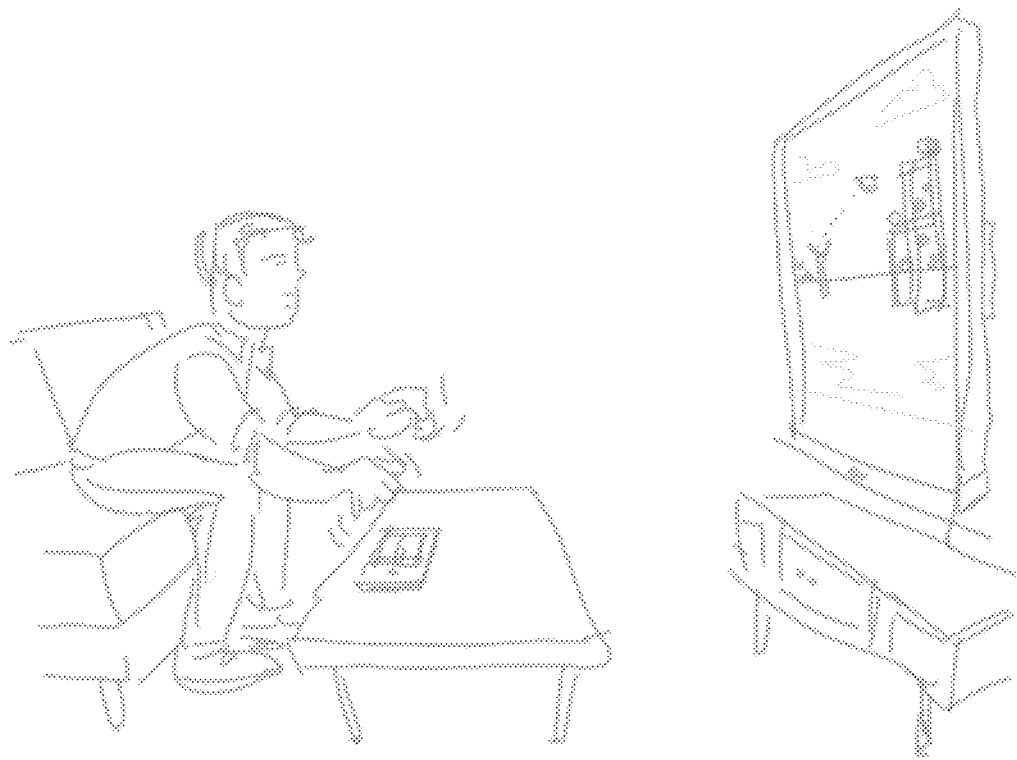
FIG. 18 depicts a scenario in which a smartphone acts as the main compute device for detecting gesture recognition in accordance with a smart TV environment in accordance with an embodiment of the invention.

Another use case involves using the cell phone as a communication device for convergence applications in the living room. In such a case, the phone is used as the gestural interface/compute engine. A smartTV is used as the main display/render device for running a game or another application. Hence, convergence becomes defined as distributing the workload between the smartphone and the smartTV, in which the smartphone acts as the main compute device for detecting gesture recognition, and the smartTV acts as the main compute device for running various applications as well as cloning the screen. See FIG. 18 for an illustration.

Figure 19:
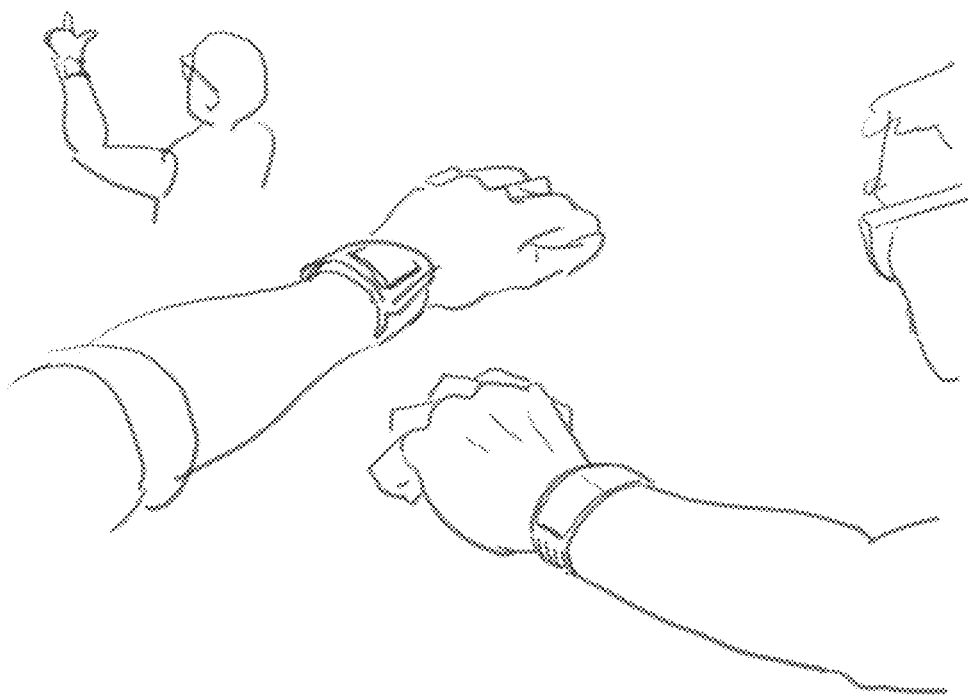
FIG. 19 depicts a watch for use with the various embodiments of the invention.

All applications described can be applied to a phone, tablet or slate, as well as a watch or other mobile computing device (See FIG. 19)

Application—Eye Tracking in Three Dimensions and Face Mapping

Another application involves face mapping. In such an application, eyes can be tracked by a number of lower resolution monochrome sensors. The sensors are then matched for color and gray value by an algorithm such as the one defined in the applications noted above and incorporated herein by reference, with which depth can be extracted. This is then used to get the pitch and yaw that is associated with the eye movement, as well as temporal tracking. With temporal stability as a feature that is extracted from the depth analysis that is suggested in the applications noted above, more degrees of freedom are associated with the eye movement.

Another variant on this approach identifies the components of the pupils that are white and associates these components with monochromatic responses in multiple monochromatic LR sensors. Matching is then attempted on the redundant information in a number of the channels, such that these redundancies are exploited to further extract features that can be used for matching. These include shape as well as temporal stability that has been mentioned above. Given the location of the camera, information about a mobile device, as well as accurate 3D eye tracking with six degrees of freedom, tracking of a person's gaze can be done quite accurately by mapping the gaze onto the screen.

Application—Face Mapping

Full face mapping can also be approached in a similar manner to what has been described for eye tracking, i.e., specifically, face tracking is done by exploiting gray scale redundancies across monochrome lower-resolution images of the face. These redundancies, according to the process that has been described in the applications incorporated herein by reference, noted above, can then be segmented, disparity decomposed, matched, and then matched for higher resolution images as well.

Note that in all of these applications, stereo imaging, which can be considered a special form of array imaging can be used to replace the suggested configuration. So, in all of these applications, it is important to note the many similarities between stereo imaging and array image sensors.

Application Mapping the Surrounding Environment

An image sensor array can be mounted on eye glasses, such as Google® glass, but with or without the augmented reality portion. A pedestrian may point at an object of interest and get information about the object, its location, as well as other information directly previewed on a wearable display, such as a smart watch.

Application—Measurement Device

A measuring device is further presented in accordance with an alternative embodiment of the invention takes advantage of the three-dimensional measurement capabilities of the sensor. Specifically, an interactive device may be developed that allows the user to highlight a region in the field of view of the camera. For instance, a coffee table can be highlighted by the user through the touchscreen on their phone or tablet, or through pointing or the like as noted above with respect to the other embodiments of this invention. The coordinates of the highlighted region are then preferably extracted from the touchscreen, as well as the associated segmented region of interest. The region may then be further segmented in all the lower resolution component images, be they monochromatic, saturation-based, or having any other color or imaging attribute. Measurement features, such as distance from sensor, xyz dimensions, and resolution, may then be extracted and used in an app or other program.

Application—3D Stitching and 3D Mosaicing

Once a three-dimensional representation of a scene is extracted, a user can move around and images with three-dimensional information built into them can then be stitched together, effectively creating a rendering of the surroundings.

Environmental Awareness

All of the different types of feature extraction tools enable a system to be more environmentally aware. A system that can track all of these different features can also enable other aspects of environmental awareness as well. For instance, a system that is used as a measuring tool can also be used to map the environment around them, by combining image mosaicing with the tools that have been described above.

The method and apparatus of the invention may be implemented on one or more computing devices including appropriate image acquisition sensors as noted in accordance with the application, one or more processors and associated storage devices, such as one or more known non-transitory storage media for storing images, computer code and the like. Additional computing elements may be employed on one or more local devices, one or more cloud computing environments, or both. It is anticipated that one or more computer programs for implementing the method may be stored to the non-transitory storage medium and cause a general purpose CPU, processor, GPU or other computing element to perform one or more elements or steps in accordance with on or more embodiments of the present invention.

It will thus be seen that the objects set forth above, among those made apparent from the preceding descriptions, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that this description is intended to cover all of the generic and specific features of the invention herein described and all statements of the scope of the invention which, as a matter of language, might be said to fall there between.

What is claimed:

1. A method for creating an adaptive mosaic pixel-wise virtual Bayer pattern, comprising the steps of:
   receiving a plurality of images from an array of imaging elements;
   creating a reference ordered set at infinity from the plurality of images;
   running a demosaicing process on the reference ordered set;
   creating a demosaiced image from the demosaiced ordered set;
   computing one or more offset artifacts resulting from the demosaicing process at a distance other than infinity; and
   modifying the ordered set in accordance with the computed offsets.

2. The method of claim 1, wherein the adaptive Bayer pattern is updated by matching row-wise and column wise disparity values.

3. The method of claim 1, further comprising the steps of:
   realigning the reference ordered set such that objects that are not at infinity are subtended by a modified Bayer pattern for better image quality;
   creating a second pattern based upon the modified Bayer pattern; and
   generating a second demosaiced image in accordance with the second pattern.

4. The method of claim 1, wherein a hand of a user is included in the received plurality of images.

5. The method of claim 4, wherein the hand of the user is used to control one or more devices.

6. The method of claim 5, wherein the one or more devices comprises a camera.

7. The method of claim 6, wherein the hand of the user is positioned within a field of view of the camera.

8. The method of claim 6, wherein the array of imaging elements is backward facing and the hand of the user is positioned behind a display of a camera within the field of view of the array of imaging elements.

9. The method of claim 8, wherein a pinch gesture by the hand of the user adjusts zoom on the display of the camera without requiring contact with the display of the camera.

10. The method of claim 8, wherein a thumbs up gesture results in the taking of a picture by the camera.

11. The method of claim 8, wherein movement of the hand of the user towards and away from the display of the camera adjusts zoom of the camera.

12. The method of claim 5, wherein the one or more devices comprise one or more electronic devices.

13. The method of claim 12, wherein the one or more electronic devices are controlled by a gestural interface, each gesture being determined based upon one or more images acquired by the array of imaging elements.

14. The method of claim 12, wherein the one or more electronic devices comprises a television.

15. The method of claim 12, wherein the one or more devices comprises a game console.

16. The method of claim 1, wherein the step of computing one or more offset artifacts is performed only on pixels in the reference image that have changed from a prior image.

17. The method of claim 1, further comprising the steps of:
    highlighting on a touchscreen, by the user, one or more regions in the demosaiced image;
    extracting the coordinates of the highlighted region from one or more of the demosaiced image and the received plurality of images;
    segmenting the region in the one of the received plurality of images and the demosaiced image from which the coordinates were extracted,
    determining a distance to the highlighted region on the display;
    determining one or more dimensions of the highlighted region in accordance with the demosaicing process.

18. The method of claim 17, wherein the highlighted region is defined by detection of an object on the touchscreen.

19. A system for creating an adaptive mosaic pixel-wise virtual Bayer pattern, comprising:
    an array of imaging elements for acquiring a plurality of images; and
    a processor for creating a reference ordered set at infinity from the acquired plurality of images, running a demosaicing process on the reference ordered set, creating a demosaiced image from the demosaiced ordered set, computing one or more offset artifacts resulting from the demosaicing process at a distance other than infinity, and modifying the ordered set in accordance with the computed offsets.

20. A non-transitory storage medium having a computer program stored thereon, the computer program causing a general purpose computer to perform the steps of:
    receiving a plurality of images from an array of imaging elements;
    creating a reference ordered set at infinity from the plurality of images;
    running a demosaicing process on the reference ordered set;
    creating a demosaiced image from the demosaiced ordered set;
    computing one or more offset artifacts resulting from the demosaicing process at a distance other than infinity; and
    modifying the ordered set in accordance with the computed offsets.

21. The non-transitory storage medium of claim 19, wherein the general purpose computer further comprises a graphical processing unit.

* * * * *